(12) United States Patent
Sanchez, Jr.

(10) Patent No.: US 7,350,482 B1
(45) Date of Patent: Apr. 1, 2008

(54) OXYGEN PRODUCING NON-POLLUTING ENGINE

(76) Inventor: Juan Sanchez, Jr., HHD CO 191st BN CMR 403 Box 4907 APO AE (US) 09059

( * ) Notice: Subject to any disclaimer, the term of this patent is extended or adjusted under 35 U.S.C. 154(b) by 227 days.

(21) Appl. No.: 11/065,679

(22) Filed: Feb. 24, 2005

Related U.S. Application Data

(60) Provisional application No. 60/548,156, filed on Feb. 24, 2004.

(51) Int. Cl.
*F03C 5/00* (2006.01)

(52) U.S. Cl. .......................... 123/1 A; 60/205

(58) Field of Classification Search .......... 123/1 A; 60/516, 519, 634, 639, 712, 721, 205, 206, 60/595, 620; 92/2
See application file for complete search history.

(56) References Cited

U.S. PATENT DOCUMENTS

| | | | |
|---|---|---|---|
| 3,709,203 A * | 1/1973 | Cettin et al. ................. 123/3 |
| 4,101,291 A | 7/1978 | Marion ........................... 44/17 |
| 4,937,152 A | 6/1990 | Sato et al. ..................... 429/30 |
| 5,242,565 A * | 9/1993 | Winsel ....................... 204/265 |
| 5,952,124 A | 9/1999 | Kainthla et al. ............. 429/224 |
| 6,860,976 B2 * | 3/2005 | Andrews et al. ............. 204/225 |
| 6,935,109 B2 * | 8/2005 | Goldfarb et al. .............. 60/530 |

* cited by examiner

*Primary Examiner*—Noah P. Kamon
*Assistant Examiner*—Jason Benton
(74) *Attorney, Agent, or Firm*—Goldstein Law Offices PC

(57) ABSTRACT

A non-polluting engine that produces mechanical, rotary motion, and produces oxygen as a principle gaseous byproduct. The engine employs a fuel mixture that includes two components that together produce oxygen. The fuel mixture is introduced to a combustion chamber where it is heated to facilitate the rapid production of oxygen. The expansion of the oxygen within the combustion chamber is translated to rotary mechanical energy. The oxygen produced during the reaction is expelled from the combustion chamber and released into the atmosphere.

4 Claims, No Drawings

OXYGEN PRODUCING NON-POLLUTING ENGINE

CROSS REFERENCES AND RELATED SUBJECT MATTER

This application is a continuation of provisional patent application Ser. No. 60/548,156, filed in the United States Patent Office on Feb. 24, 2004.

BACKGROUND OF THE INVENTION

The invention relates to a non-polluting engine. More particularly, the invention relates to an engine that produces oxygen as a gaseous byproduct.

Since the industrial revolution, air polluting has been a problem of increasing gravity. Since most machines burn carbon-based fossil fuels, the byproduct of most combustion engines is a carbon-based gas, such as carbon dioxide or carbon monoxide. Carbon monoxide is especially poisonous, and creates a grave danger to humans. Other by products of standard combustion engines damage the ozone layer, pollute or skies, and then fall back to the earth and pollute our lakes and rivers, as well as the soil.

Conventional internal combustion engines operate by introducing a mixture of oxygen and a combustible fuel, such as gasoline, in a chamber known as a cylinder. Once in the cylinder, the mixture is ignited, causing rapid expansion of the fuel mixture that forces a piston to move outwardly. The motion of the piston is translated into rotary motion of a crank shaft by a connecting arm that extends from the piston and is eccentrically attached to the crank shaft.

Following the "power cycle", the piston forces the byproducts of combustion to be expelled during an "exhaust cycle". As previously noted, typically these byproducts include carbon monoxide, and other harmful substances. Modern automobile engines have pollution control devices that remove some, but not all pollutants from the exhaust before it is expelled into the atmosphere.

The search for alternative fuels became intense in the 1970's, when a shortage of fossil fuels forced us to closely study other sources of energy. With all of the research that followed, however, few practical solutions were proposed.

U.S. Pat. No. 4,101,291 to Marion discloses an oxygen gas generator. Marion does not, however, produce mechanical energy during the oxygen generation process.

U.S. Pat. No. 5,952,124 to Kainthla et al. discloses a rechargeable electrochemical cell with modified manganese oxide positive electrode. U.S. Pat. No. 4,937,152 to Sato et al. discloses a fuel cell that produces oxygen. These devices do not, however, produce mechanical energy during operation.

While these units may be suitable for the particular purpose employed, or for general use, they would not be as suitable for the purposes of the present invention as disclosed hereafter.

SUMMARY OF THE INVENTION

It is an object of the invention to produce a pollution free engine. Accordingly, the invention produces oxygen as the major gaseous byproduct of operation.

It is another object of the invention to provide a pollution free engine that produces usable mechanical energy. Accordingly, the engine captures mechanical energy from the expansion of the fuel mixture as it produces oxygen within the confines of a combustion chamber.

It is a further object of the invention to use nonvolatile fuels that can be stored safely prior to use. Accordingly, the chemicals employed are typically non-flammable, and rapidly produce oxygen only when mixed and heated.

It is yet a further object of the invention to operate the engine in a cost effective manner. Accordingly, the engine uses inexpensive, and readily available chemicals.

The invention is a non-polluting engine that produces mechanical, rotary motion, and produces oxygen as a principle gaseous byproduct. The engine employs a fuel mixture that includes two components that together produce oxygen. The fuel mixture is introduced to a combustion chamber where it is heated to facilitate the rapid production of oxygen. The expansion of the oxygen within the combustion chamber is translated to rotary mechanical energy. The oxygen produced during the reaction is expelled from the combustion chamber and released into the atmosphere.

To the accomplishment of the above and related objects the invention may be embodied in the form described herein. Attention is called to the fact, however, that the detailed description of the preferred embodiment is illustrative only. Variations are contemplated as being part of the invention, limited only by the scope of the claims.

DETAILED DESCRIPTION OF THE PREFERRED EMBODIMENTS

The present invention, as described hereinbelow, operates within the context of a standard internal combustion engine, with modifications appropriate the goals of the invention as described herein. Detailed description of the operation of an internal combustion engine is not provided herein, as such details are well known to those of ordinary skill in the art. Departures from standard structures and operation, however, are indicated herein to enable those of ordinary skill in the art to practice the present invention.

The invention is a non-polluting engine that operates according to the major principles of an internal combustion engine. That is, it harnesses the mechanical energy created by the rapid expansion of gases within a combustion chamber to produce rotary mechanical energy that may be used to propel an automobile, or for any other purpose. Distinct from standard internal combustion engines, however, the rapid expansion of gases is not created by "burning" or "rapid oxidation" of fossil fuels as in the standard internal combustion engine, but is from the rapid expansion of oxygen produced by chemical reaction. As used herein, however, "combustion" is still used to refer to the chemical reaction occurring within the engine. Similarly, it should be noted that the combustion chamber according to the present invention might also be termed a "reaction chamber", since burning does not take place therein.

The engine of the present invention is powered by a fuel mixture comprising two or more components. The components are selected such that when combined they produce oxygen as the principle gaseous byproduct, and produce relatively inert, insignificant, and containable secondary byproducts. For example, the components may include potassium chlorate and manganese dioxide; sulfuric acid and manganese dioxide; mercury oxide and manganese dioxide; and hydrogen peroxide and manganese dioxide. All of these combinations will produce oxygen, yet are relatively stable at room temperature, and relatively inexpensive.

According to the present invention, the fuel mixture components are mixed in the combustion chamber of the engine. Since the chemicals are relatively stable they might produce slowly produce oxygen once mixed. To facilitate the rapid production of oxygen, however, the mixture is preferably heated within the combustion chamber. Accordingly, the combustion chamber (or "cylinder") of a standard internal combustion engine is modified such that it is capable of heating the mixture introduced thereinto. In particular, a heating coil might be employed to heat the cylinder and its contents. Alternatively, the cylinder might be maintained at temperature by heated fluids surrounding the cylinder, or any other means. The best method of heating the fuel mixture will be determined by empirical experimentation. In addition, the necessity of for the spark plug is eliminated, since it is not desirable to ignite the mixture.

Once the fuel mixture has been suitably heated, rapid production of oxygen will result. Within the confines of the combustion chamber, the rapid production of oxygen will produce a downward or outward motion of the piston, and thereby create rotary motion of the crank shaft. Accordingly, without burning, mechanical energy is produced by the chemical reaction associated with the production of oxygen.

As in most internal combustion engines, multiple cylinders are preferably employed. Accordingly, from the "power stroke" of one cylinder, an "exhaust stroke" is created in other cylinders. Thus, following the reaction detailed above, the piston will be returned upwardly to complete an exhaust stroke. As in a conventional internal combustion engine, an exhaust valve is opened, the gases in the combustion chamber are compressed by the movement of the piston, and the by products of the reaction are expelled therefrom. In the case of the present invention, however, the principle gaseous by product is oxygen. After being expelled through the exhaust valve, the oxygen is safely released into the atmosphere.

It must be acknowledged that most reactions will have other, secondary byproducts. In the case of many of the fuel components listed above, secondary byproducts are in liquid form, typically dissolved solids within water. Accordingly, the apparatus of the internal combustion engine may be modified to capture liquid byproducts and place them in a waste tank. The liquid byproducts are preferable to gaseous byproducts, since they are more easily contained. They may be pumped out of waste tank periodically for recycling and recovery.

In summary, the present invention produces mechanical energy without producing hazardous pollutants by mixing and heating fuel components that thereby rapidly produce oxygen, and harnessing the mechanical energy produced by the expansion of the rapidly produced oxygen. The oxygen thus produced may be safely expelled into the atmosphere.

In conclusion, herein is presented an oxygen producing non-polluting engine. The invention is illustrated by example throughout the written description. It should be understood that numerous variations are possible, while adhering to the inventive concept. Such variations are contemplated as being a part of the present invention.

What is claimed is:

1. A non-polluting engine method, using an engine having a cylinder and a piston movable within the cylinder to create a combustion chamber between the piston and cylinder, using a fuel mixture comprising a pair of fuel components that together produce oxygen, comprising the steps of:

introducing the fuel components into the combustion chamber; and moving the piston by expanding the combustion chamber by producing oxygen by combining the fuel components within the combustion chamber and heating the fuel components to facilitate a chemical reaction between said fuel components.

2. The non-polluting engine method as recited in claim 1, wherein the fuel components that together produce oxygen are selected from the group consisting of: potassium chlorate and manganese dioxide; sulfuric acid and manganese dioxide; mercury oxide and manganese dioxide; and hydrogen peroxide and manganese dioxide.

3. The non-polluting engine method as recited in claim 1, wherein the step of moving the piston further comprises creating rotary mechanical motion.

4. The non-polluting engine method as recited in claim 3, wherein the method as recited further comprises expelling oxygen from the combustion chamber by compressing the combustion chamber by moving the piston.

* * * * *